United States Patent
Kanemoto

(10) Patent No.: US 11,216,554 B2
(45) Date of Patent: Jan. 4, 2022

(54) DETERMINING APPARATUS, DETERMINING METHOD, AND DETERMINING PROGRAM

(71) Applicant: NIPPON TELEGRAPH AND TELEPHONE CORPORATION, Tokyo (JP)

(72) Inventor: Yo Kanemoto, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 211 days.

(21) Appl. No.: 16/629,038

(22) PCT Filed: Jul. 11, 2018

(86) PCT No.: PCT/JP2018/026230
§ 371 (c)(1),
(2) Date: Jan. 7, 2020

(87) PCT Pub. No.: WO2019/013266
PCT Pub. Date: Jan. 17, 2019

(65) Prior Publication Data
US 2020/0201987 A1     Jun. 25, 2020

(30) Foreign Application Priority Data
Jul. 12, 2017  (JP) .............................. JP2017-136397

(51) Int. Cl.
*G06F 21/00* (2013.01)
*G06F 21/55* (2013.01)

(52) U.S. Cl.
CPC ...... *G06F 21/552* (2013.01); *G06F 2221/034* (2013.01)

(58) Field of Classification Search
CPC ............. G06F 21/552; G06F 2221/034; H04L 63/00; H04L 63/02; H04L 63/14
(Continued)

(56) References Cited

U.S. PATENT DOCUMENTS

2006/0242703 A1  10/2006 Abeni
2008/0010683 A1*  1/2008 Baddour ............... G06F 16/951
                                                    726/24
(Continued)

FOREIGN PATENT DOCUMENTS

EP   3 144 840 A1   3/2017
JP   2004-30287 A   1/2004

OTHER PUBLICATIONS

Extended European Search Report dated Feb. 8, 2021 in European Application No. 18831924.8.
(Continued)

*Primary Examiner* — Josnel Jeudy
(74) *Attorney, Agent, or Firm* — Xsensus LLP

(57) ABSTRACT

A determining apparatus performs emulation of an attack code included in an attack request that is addressed to a web application (web server), based on the attack type of the attack code, and extracts a feature that appears in a response issued by the web application when the emulation results in a successful attack. The determining apparatus determines that the attack has succeeded if the feature is included in a response from the web application, and determines that the attack has failed if the feature is not included.

8 Claims, 11 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2008/0133540 | A1* | 6/2008 | Hubbard | H04L 63/1483 |
| 2011/0099620 | A1* | 4/2011 | Stavrou | H04L 63/0884 |
| | | | | 726/12 |
| 2016/0285897 | A1* | 9/2016 | Gantman | H04L 63/145 |
| 2016/0337400 | A1 | 11/2016 | Gupta | |
| 2017/0126724 | A1* | 5/2017 | Zhong | G06F 13/00 |
| 2017/0228541 | A1* | 8/2017 | Takata | G06F 21/566 |
| 2018/0012021 | A1* | 1/2018 | Volkov | G06F 21/53 |
| 2021/0279332 | A1* | 9/2021 | Goldshmidt | G06F 21/566 |

OTHER PUBLICATIONS

Halfond W G J et al: "Penetration Testing with Improved Input Vector Identification", Software Testing Verification and Validation, 2009. ICST '09, International Conferecne on, IEEE, Piscataway, NJ, USA, Apr. 1, 2009 (Apr. 1, 2009), pp. 346-355, XP031449419.
International Search Report and Written Opinion dated Aug. 21, 2018 for PCT/JP2018/026230 filed on Jul. 11, 2018, 9 pages including English Translation of the International Search Report.
Abbasi, A., et al., "On Emulation-Based Network Intrusion Detection Systems," Proceedings of the 17th International Symposium on Research in Attacks, Intrusions and Defenses (RAID), Springer, Switzerland, Sep. 18, 2014, pp. 384-404.
Kruegel, C., and Robertson, W., "Alert Verification Determining the Success of Intrusion Attempts," Proceedings of the Conference on Detection of Intrusions and Malware & Vulnerability Assessment (DIMVA), Jul. 2004, 15 pages.
Mizutani, M., et al., "The Design and Implementation of Session Based IDS," The Institute of Electronics, Information and Communication Engineers (IEICE), vol. J88-B, No. 3, Mar. 1, 2005, pp. 551-562 (with English Translation of section 5.4).
Sommer, R., and Paxson, V., "Enhancing byte-level network intrusion detection signatures with context," Proceedings of the 10th ACM Conference on Computer and Communications Security, Washington, DC, USA, Oct. 27-31, 2003, pp. 262-271.
Vigna, G., et al., "A Stateful Intrusion Detection System for World-Wide Web Servers," Proceedings of the 19th Annual Computer Security Applications Conference (ACSAC 2003), IEEE, Dec. 2003, 10 pages.
Zhou, J., et al., "Verify results of network intrusion alerts using lightweight protocol analysis," 21st Annual Computer Security Applications Conference (ACSAC 2005), IEEE, Dec. 2005, 10 pages.

* cited by examiner

FIG.3

| ATTACK TYPE | SUB-ATTACK TYPE | KEYWORD |
|---|---|---|
| A | | cat, ls, wget, curl, echo, print, exec, php, python, ruby, ⋯ |
| B | PHP | print_r, var_dump, base64_decode, ⋯<br>$_GET, $_POST, ⋯ |
| B | Java | java., javax., @ognl.<br>AND SO ON |
| B | Perl | ⋯ |
| B | ⋯ | ⋯ |
| C | | select, update, insert, drop, ⋯<br>information_schema, @@version, mysql., ⋯ |
| D | | <, >, script, iframe, document., window., onmouse, onclick, alert(, ⋯ |
| E | | ../, ./../, ⋯ |

FIG.6

· ATTACK CODE:1234);echo 123456789;

| PARTIAL ATTACK CODE | STANDARD OUTPUT/<br>STANDARD ERROR OUTPUT |
|---|---|
| 1234);echo 123456789; | -bash:syntax error near unexpected token |
| );echo 123456789; | -bash:syntax error near unexpected token |
| ;echo 123456789; | -bash:syntax error near unexpected token |
| echo 123456789; | 123456789 |
| 123456789; | -bash:123456789:command not found |
| ; | -bash:syntax error near unexpected token |

· FEATURE CANDIDATE
  ·-bash:syntax error near unexpected token
  ·123456789
  ·-bash:123456789: command not found

CHARACTER CLASS DEFINITION

| CHARACTER CLASS | REGULAR EXPRESSION |
|---|---|
| ALPHABET | [a-zA-Z]+ |
| NUMBER | [0-9]+ |
| SPACE | [\s]+ |
| ... | ... |

FIG.7

(1)
- ATTACK REQUEST:
  GET /index.php?id=1' union select sleep(10) --
- TIME:2017/4/1 00:00:00

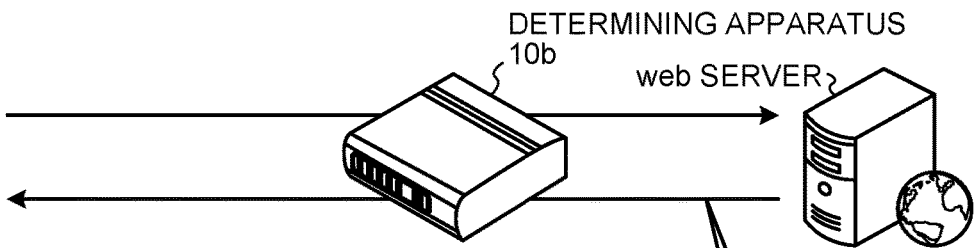

DETERMINING APPARATUS
10b
web SERVER (2)
- ATTACK CODE:
  · select sleep(10)
- TYPE:
  · C. ABUSING SQL COMMAND (FUNCTION OF DB)
- FEATURE
  · REQUEST PROCESSING TIME:
    10 SECONDS OR LONGER (4)
- INSPECTION RESULT
  · DETERMINED THAT ATTACK HAS
    SUCCEEDED (3)
- RESPONSE:
HTTP/1.1 200 OK
Date:2017/4/1

<html><title>Hello</title></html>

TIME:2017/4/1 00:00:11

FIG.10
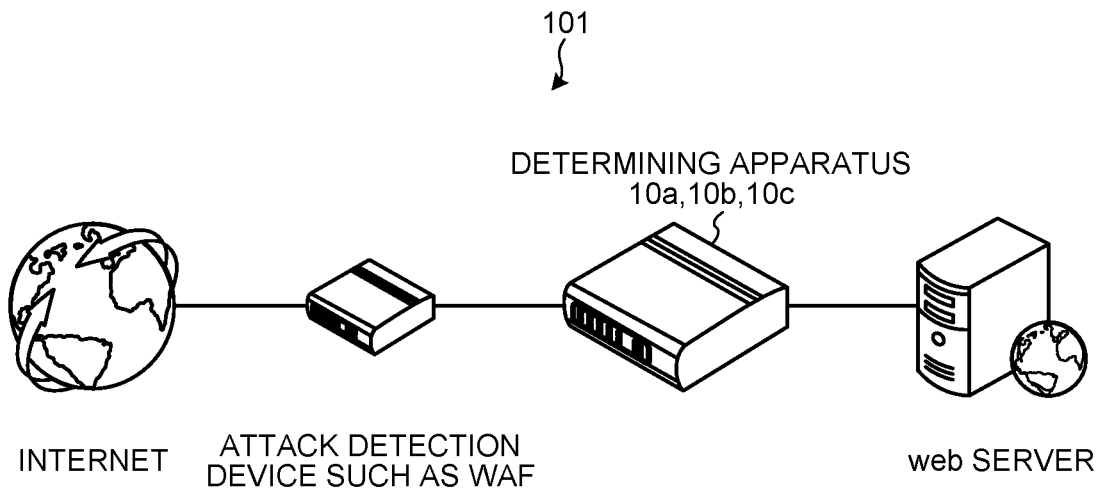
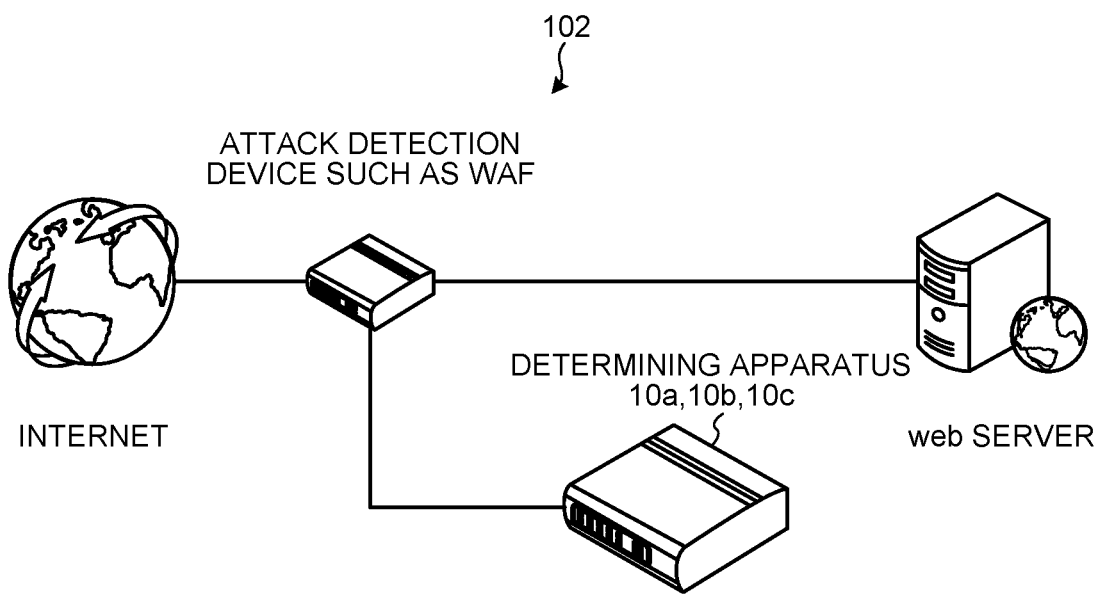

DETERMINING APPARATUS, DETERMINING METHOD, AND DETERMINING PROGRAM

CROSS-REFERENCE TO RELATED APPLICATIONS

The present application is based on PCT filing PCT/JP2018/026230, filed Jul. 11, 2018, which claims priority to JP 2017-136397, filed Jul. 12, 2017, the entire contents of each are incorporated herein by reference.

FIELD

The present invention relates to a determining apparatus, a determining method, and a determining program.

BACKGROUND

While web applications are used in many services, web applications are characterized in their risks to exposure to attacks, because web applications permit accesses of a large number of public users. An attack can be detected using devices such as a web application firewall (WAF) and a network-based intrusion detection system (NIDS), while a large number of alerts need to be investigated and verified manually to determine whether the attack has succeeded. A possible solution to this issue is to use technologies such as a host-based intrusion detection system (HIDS), a stateful IDS (see Non Patent Literatures 1 to 3), a correlation analysis with vulnerability information (see Non Patent Literature 4), and an attack code emulation (see Non Patent Literature 5) in determining the success of an attack.

CITATION LIST

Non Patent Literature

Non Patent Literature 1: G. Vigna et al., "A Stateful Intrusion Detection System for World-Wide Web Servers", ACSAC, 2003
Non Patent Literature 2: R. Sommer et al., "Enhancing Byte-Level Network Intrusion Detection Signatures with Context", CCS, 2003
Non Patent Literature 3: J. Zhou et al., "Verify Results of Network Intrusion Alerts Using Lightweight Protocol Analysis", ACSAC, 2005
Non Patent Literature 4: C. Kruegel et al., "Alert Verification Determining the Success of Intrusion Attempts", DIMVA, 2004
Non Patent Literature 5: A. Abbasi et al., "On Emulation-Based Network Intrusion Detection Systems", RAID, 2014

SUMMARY

Technical Problem

However, to use an HIDS, because it is necessary to install the HIDS on a server, a modification is required in the system that is used as a server. In the case of a stateful IDS, the behaviors of attacks need to be defined in advance. Furthermore, to perform a correlation analysis with vulnerability information, it is necessary to collect the vulnerability information in advance. Moreover, an attack code emulation (in particular, an attack code emulation using the technology disclosed in Non Patent Literature 5) is capable of supporting only emulation of binary codes such as x86, and therefore, the emulation is not capable of handling attacks to web applications. Therefore, the present invention is intended to address these issues, and an object of the present invention is to enable a determination to be made as to whether an attack to a web application has succeeded or failed without requiring any modifications in an existing system, definitions of attacks, or collection of vulnerability information.

Solution to Problem

To solve the above-described problems, the present invention is a determining apparatus for determining whether an attack to a server using an attack code has succeeded or failed, the determining apparatus comprising: an attack type determining unit that determines an attack type of an attack code included in an attack request that is addressed to the server; a feature extracting unit that executes emulation of an attack with the attack code to the server based on the determined attack type, and that extracts a feature that appears in a response issued by the server when the emulation results in a successful attack to the server; and a determining unit that determines that the attack with the attack code has succeeded when a response from the server for which a success or failure of the attack is to be determined has the extracted feature.

Advantageous Effects of Invention

According to the present invention, it is possible to determine whether an attack to a web application has succeeded or failed without requiring any modifications in an existing system, any definitions of attacks, or collection of vulnerability information.

BRIEF DESCRIPTION OF DRAWINGS

FIG. 3 is a schematic illustrating an example of the attack type keyword list illustrated in FIG. 2.
FIG. 6 is a schematic illustrating an example of how the determining apparatus illustrated in FIG. 5 extracts parts of an attack code.
FIG. 7 is a schematic for explaining a general operation of a determining apparatus according to a third embodiment.
FIG. 10 is a schematic illustrating an exemplary configuration of a network including the determining apparatus according to the embodiments.

DESCRIPTION OF EMBODIMENTS

Embodiments of the present invention will now be explained with reference to the drawings. The present invention is, however, not limited to these embodiments. In the explanation below, it is assumed that an attack using an attack code to a web server is an attack using an attack code to a web application on a web server.

First Embodiment

[Overview]

Figure 1:
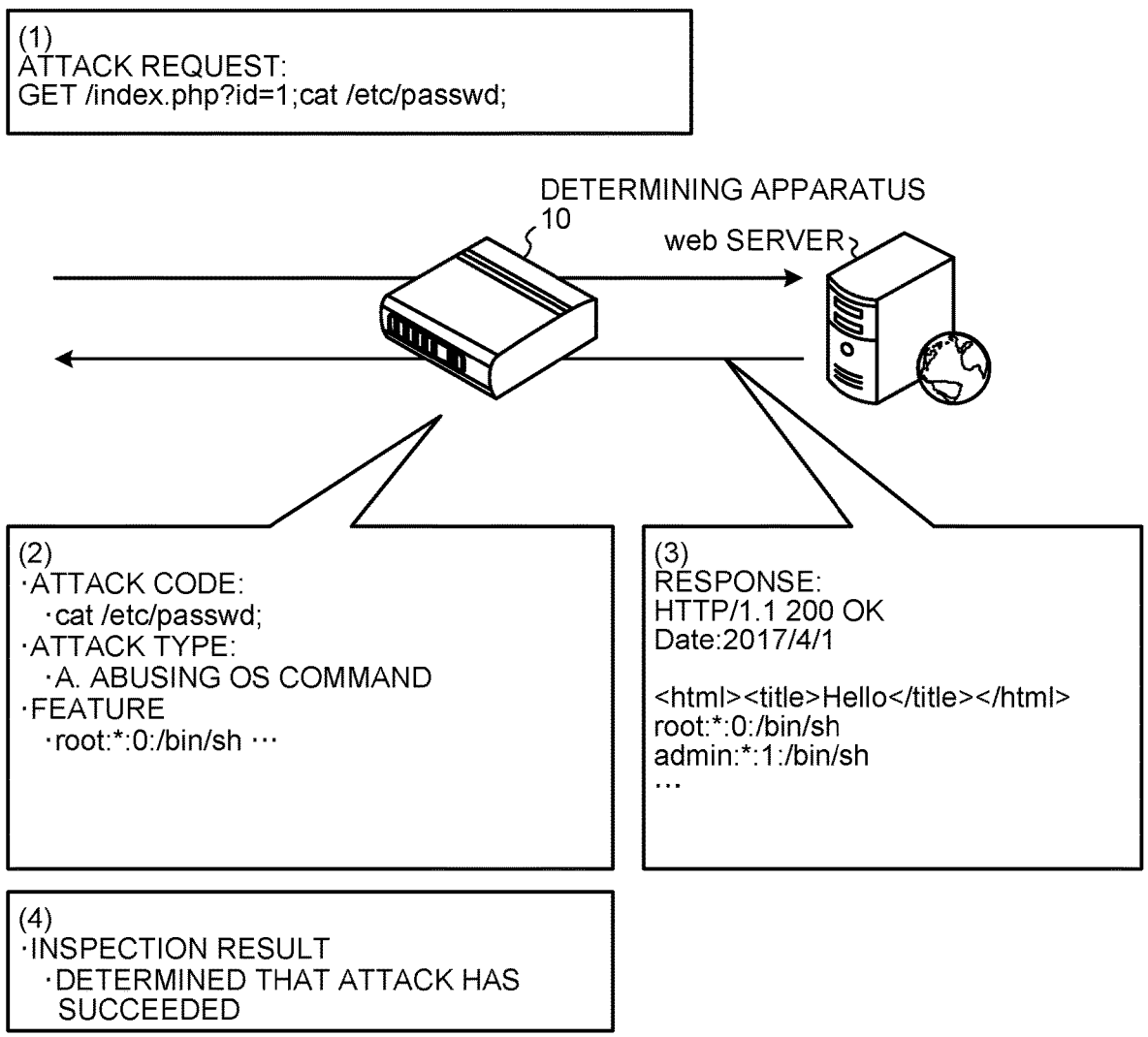
FIG. 1 is a schematic for explaining a general operation of a determining apparatus according to a first embodiment.

A general operation of a determining apparatus 10 according to a first embodiment will now be explained with reference to FIG. 1. To begin with, for example, as illustrated in FIG. 1, when the determining apparatus 10 receives an attack request ((1)) addressed to a web application (web server), the determining apparatus 10 identifies an attack code included in the attack request, and an attack type. The determining apparatus 10 then executes the attack code using an emulator corresponding to the identified attack type (e.g., Attack Type A. abusing an operating system (OS) command), and extracts information that is output from the web server, as a result of the execution, as a feature that is output when the attack succeeds (e.g., "root:*:0:/bin/sh . . . ") ((2)).

The determining apparatus 10 then inspects a response ((3)) from the web server. If the feature extracted at (2) (e.g., "root:*:0:/bin/sh") is included in the response, the determining apparatus 10 determines that the attack has succeeded ((4) inspection result: attack has succeeded).

In this manner, the determining apparatus 10 can determine whether an attack to a web application has succeeded or failed without requiring any modifications in the existing system, definitions of attacks, or collection of vulnerability information.

[Configuration]

A configuration of the determining apparatus 10 will now be explained with reference to FIG. 2. The determining apparatus 10 includes a storage unit 11, an attack detecting unit 121, an attack type determining unit 122, an attack code analyzing unit (feature extracting unit) 123, a feature selecting unit 124, and a feature inspecting unit (determining unit) 125.

The storage unit 11 has an area in which an attack type keyword list 111, a feature candidate database (DB) 112, a response DB 113, and a feature DB 114 are stored.

The attack type keyword list 111 is information that specifies, for each of the attack types, keywords included in the attack codes belonging to this attack type. The attack type determining unit 122 determines an attack type based on the keyword included in the attack code, by referring to the attack type keyword list 111.

The attacks are classified, for example, into the following five types: Attack Type A. abusing an OS command; Attack Type B. abusing a program code; Attack Type C. abusing an SQL command (functions of a DB) (e.g., SQL injection); Attack Type D. abusing an HTTP response (e.g., XSS, header injection); and Attack Type E. abusing a file operation (e.g., a directory traversal).

As illustrated in FIG. 3, for Attack Type A., the name of an OS command is used as a keyword. For Attack Type B., a unique expression used in the programming language is used as a keyword. For example, for Hypertext Preprocessor (PHP), functions that are unique to PHP, such as print_r, var_dump, and base64_decode, and expressions that are unique to PHP (e.g., $_GET, $_POST) are used as keywords. The same applies to the other programming languages (such as Java (registered trademark), Perl, Ruby, and Python). Therefore, for Attack Type B., the attack type keyword list is retained for each of such programming languages. The information as to whether a keyword corresponds to which programming language is retained as a sub-attack type, as illustrated in FIG. 3.

For Attack Type C., the names of SQL commands (e.g., select, update, insert, drop), or characterizing expressions used in accessing the DB are used as keywords. Examples of the keywords for MySQL include information schema, @@version, and mysql. For Attack Type D., expressions that are uniquely used in Hypertext Markup Language (HTML) or Javascript (registered trademark) (e.g., alert(, onclick) are used as keywords. For Attack Type E., expressions that are uniquely used by directory traversal attacks (e.g., ../) are used as keywords.

Figure 2:
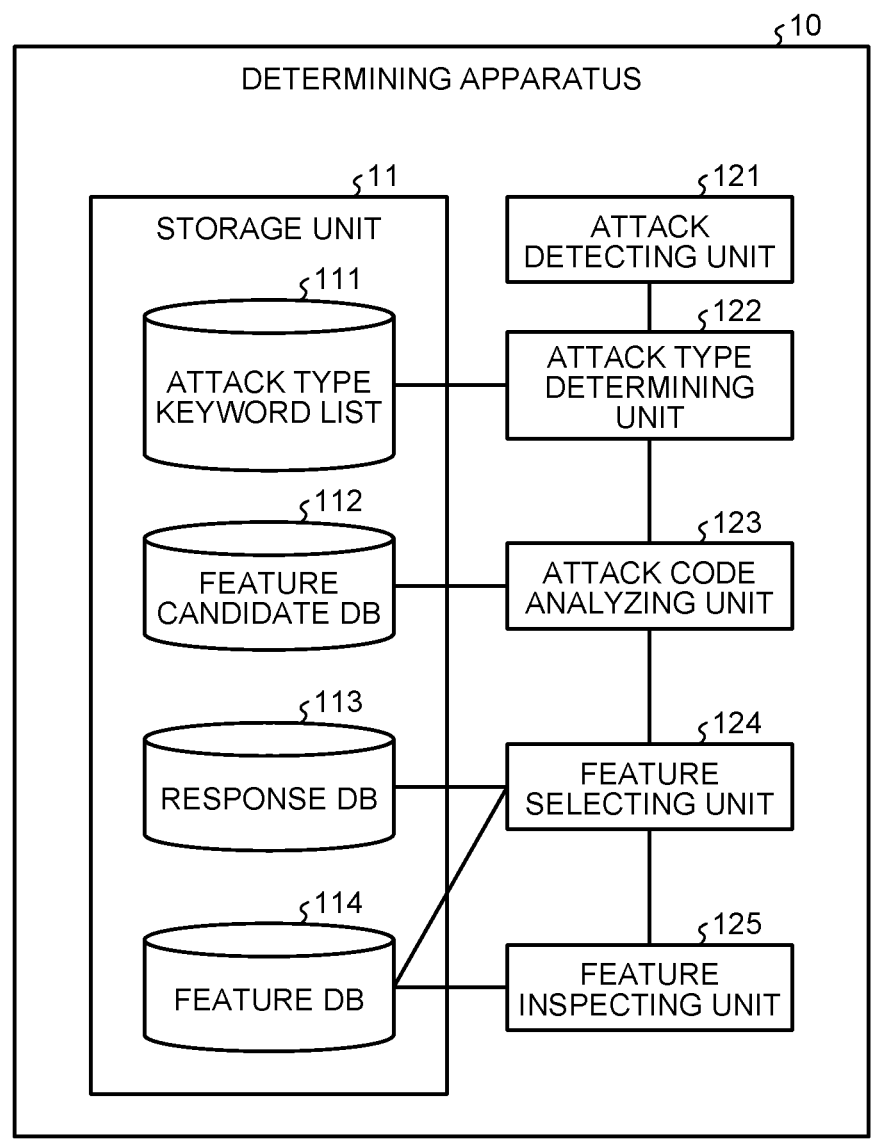
FIG. 2 is a schematic illustrating an exemplary configuration of the determining apparatus illustrated in FIG. 1.

Let us now return to the explanation of FIG. 2. The feature candidate DB 112 stores therein information (feature candidates) output from the web server, as a result of the attack code analyzing unit 123 executing emulation of attack codes.

The response DB 113 stores therein responses from various web applications (web servers). The feature selecting unit 124 refers to this response DB 113 to exclude words appearing frequently in ordinary responses (universal words) from the feature candidates. The response DB 113 is built by acquiring responses in a test environment where it is ensured that there is no attack, for example. Alternatively, the response DB 113 may be built using the responses to requests that are not detected by the attack detecting unit 121.

The feature DB 114 stores therein features that are output from the web server as a result of successful attacks using attack codes. Specifically, the feature DB 114 stores therein features selected from feature candidates stored in the feature candidate DB 112, being selected by the feature selecting unit 124. The feature inspecting unit 125 refers to the features stored in this feature DB 114 to determine whether an attack has succeeded, based on a response from the web server.

The attack detecting unit 121 determines whether a request addressed to the web server is an attack (detects an attack). As an algorithm for detecting an attack, the attack detecting unit 121 may use an existing signature detection algorithm (such as Snort (https://www.snort.org/) or Bro (https://www.bro.org/)), or an anomaly detection algorithm (see "Detecting Malicious Inputs of Web Application Parameters Using Character Class Sequences", COMPSAC, 2015, for example).

It is assumed herein that the URL encoding and the HTML encoding of a request to be processed by the attack detecting unit 121 have been decoded. For example, it is assumed that, when the request is "GET /index.php?id=1234%3Bcat%20%2Fetc%2Fpasswd%3B", the request has been decoded to "GET/index.php?id=1234; cat /etc/passwd;".

It is also assumed that the existing signature detection or anomaly detection algorithm mentioned above is used to output a part corresponding to the attack code included in the request. For example, it is assumed that, when the request is "GET/index.php?id=1234;cat /etc/passwd;", the algorithm is used to output "1234;cat /etc/passwd;" that is the part corresponding to the attack code included in the request.

The attack type determining unit 122 determines the attack type of an attack code included in a request that is determined to be an attack by the attack detecting unit 121.

The attack type determining unit 122 determines, for example, to which one of the five attack types (Attack Types A. to E. mentioned above) the attack belongs, and these are types of attacks that are considered as of particular significance, among the attacks to web applications. The determination of an attack type is made by identifying, from the attack type keyword list 111 (see FIG. 3), the attack type specified with a keyword matching the keyword included in the attack code.

For example, if the attack code includes "cat", the attack type determining unit 122 determines that the attack code belongs to Attack Type A. (an attack abusing an OS command) by referring to the attack type keyword list 111. If the attack code includes "print_r", the attack type determining unit 122 determines that the attack code belongs to the Attack Type B. (an attack abusing a program code), and also determines that the attack code belongs to the type of attacks using php, among those belonging to Attack Type B.

If an attack code finds matches in a plurality of attack types in the attack type keyword list 111 (see FIG. 3), the attack type determining unit 122 determines that the attack code belongs to the attack type corresponding to the first keyword appearing in the attack code (the keyword appearing on the leftmost position in the attack code), for example.

To explain using one example, if the attack code is ";php -e "$i=123456789;var_dump($1)";", keywords "php" and "var_dump" appear in the attack code, which belong to Attack Type A. and Attack Type B., respectively, specified in the attack type keyword list 111. In such a case, the attack type determining unit 122 determines that this attack code belongs to Attack Type A. because "php" appears before "var_dump" in the attack code.

The attack type determining unit 122 determines that the attack type cannot be determined if the attack code finds no match in any of the attack types by referring to the attack type keyword list 111.

The attack code analyzing unit 123 extracts the feature (output) that appears in a response from the web server when the attack code is executed, by performing a dynamic analysis of the attack code using an emulator.

Specifically, the attack code analyzing unit 123 performs emulation of the attack to the web application using the attack code, with the emulator corresponding to the attack type of the attack code, the attack type being determined by the attack type determining unit 122. The attack code analyzing unit 123 then extracts the output generated as a response to the attack, as a result of the emulation of the attack code, as a feature candidate that appears when the attack succeeds.

The emulator corresponding to each of the attack types is created in advance, by making use of a debugger or an interpreter, for example, and the attack code analyzing unit 123 selects the emulator corresponding to the attack type, among those created in advance.

The attack code analyzing unit 123 extracts the feature (output) appearing in the response to a request, when the attack code is executed in the following manner, for example.

For example, when the attack type of the attack code is Attack Type A. abusing an OS command, the attack code analyzing unit 123 executes the attack code as a command using an environment capable of executing OS commands (e.g., using an emulator capable of emulating Windows (registered trademark) command prompts, or Linux (registered trademark) bash or commands).

To explain using one example, the attack code analyzing unit 123 causes the emulator to execute a bash command in which the attack code is designated as an argument to a "-c" option, e.g. "bash -c "cat/etc/passwd;"". The attack code analyzing unit 123 extracts the content of a standard output and a standard error output from the execution of the command as feature candidates. For example, for the attack code "cat/etc/passwd;", the attack code analyzing unit 123 extracts information of a standard output "root:*:0:/bin/sh . . . " and a standard error output "none" as a feature candidate.

If the attack type of the attack code is Attack Type B. abusing a program code, for example, the attack code analyzing unit 123 executes the attack code using an interpreter or an emulator that is appropriate for the programming language.

To explain using one example, if the attack code is a php code, the attack code analyzing unit 123 causes a php interpreter to execute a code in which the attack code is designated as an argument to a -r option, e.g., "php -r "print('123456789');die( )"". If the attack code is a python code, the attack code analyzing unit 123 causes a python interpreter to execute a code in which the attack code is designated as an argument to a -c option, e.g., "python -c "import sys;print 123456789;sys.exit( )"".

After executing the code, the attack code analyzing unit 123 extracts the content of the standard output and the standard error output as feature candidates. For example, if the attack code is a php code "print('123456789');die( )", the attack code analyzing unit 123 extracts information of a standard output being "123456789" and a standard error output being "none", as feature candidates.

If the attack type of the attack code is Attack Type C. abusing an SQL command (functions of a DB) (e.g., an SQL injection), the attack code analyzing unit 123 executes the attack code using a terminal or an emulator capable of executing SQL statements on the DB.

An SQL statement (SQL command) injected by an SQL injection attack is only partial, and cannot be executed as it is. Therefore, the attack code analyzing unit 123 shapes the SQL statement. For example, the attack code analyzing unit 123 modifies the SQL statement by deleting the part preceding a SELECT phrase or the like in the SQL statement, so that the SELECT phrase or the like appears at the beginning of the attack code. The keyword included in the phrase of the SQL statement and coming to appear in the beginning as a result of the adjustment performed by the attack code analyzing unit 123 may be any phrase other than the SELECT phrase (e.g., update, delete, and drop), and these phrases are given in the attack type keyword list 111 (see FIG. 3).

The attack code analyzing unit 123 extracts the content of the standard output and the standard error output resultant of executing the shaped SQL statement as feature candidates. For example, the attack code analyzing unit 123 shapes the attack code "'union select 123456789-" to "select 123456789". The attack code analyzing unit 123 then extracts information of a standard output "123456789" and a standard error output "none" resultant of executing the shaped attack code, as feature candidates.

If the attack type of the attack code is Attack Type D. abusing an HTTP response (e.g., XSS or a header injection), because the attack code itself is sent to the client as a response due to the nature of the attack, the attack code analyzing unit 123 extracts the attack code itself as a feature candidate.

For example, if the attack code is an attack code "<script>alert(1)</script>" using XSS, the attack code analyzing unit 123 extracts "<script>alert(1)</script>" as a feature candidate. If the attack code is an attack code "\r\nSet-Cookie:1234;" using header injection, the attack code analyzing unit 123 extracts "\r\nSet-Cookie:1234;" as a feature candidate.

If the attack type of the attack code is Attack Type E. abusing a file operation (e.g., a directory traversal), the attack code analyzing unit 123 retrieves a file name appearing in the attack code from the OS, and extracts the content of the file having the file name as a feature candidate.

For example, if the attack code is "../../../../etc/passwd", the attack code analyzing unit 123 extracts "root:*:0:/bin/sh . . . " that is the content of the file that has the file name appearing in the attack code, and that is retrieved from the OS, as a feature candidate.

In this manner, the attack code analyzing unit 123 can execute emulation corresponding to the attack type of the attack code, and extract the feature of the success of the attack using the attack code (feature candidate). The feature candidate extracted by the attack code analyzing unit 123 is stored in the feature candidate DB 112.

The feature selecting unit 124 excludes candidates that are inappropriate as features, from the feature candidates extracted by the attack code analyzing unit 123. Specifically, the feature selecting unit 124 excludes feature candidates that are highly likely to be not usable in determining the success or failure of an attack, due to the reason that the feature candidates are too universal, from the feature candidates stored in the feature candidate DB 112.

For example, the feature selecting unit 124 excludes feature candidates having a character string length that is extremely short (e.g., having a character string length equal to or shorter than two), and then excludes feature candidates that are universal words appearing in ordinary responses, from those stored in the feature candidate DB 112. The feature selecting unit 124 then stores the remaining feature candidates in the feature DB 114, as the features of success of attacks.

For example, among the feature candidates "1", "2", "title", "page", and "123456789", the feature selecting unit 124 excludes the feature candidates "1" and "2" both of which have a character string length equal to or shorter than a predetermined length (two, for example). The feature selecting unit 124 then excludes universal words from the feature candidates "title", "page", and "123456789" remaining from excluding the feature candidates having a character string length equal to or shorter than the predetermined length (two, for example).

The universal words herein mean words included in responses to non-attack requests, for example. Therefore, the feature selecting unit 124 refers to the response DB 113 that is a set of responses to non-attack requests, and excludes the feature candidates appearing at a frequency of once or more in the response DB 113, from the feature candidates "title", "page", and "123456789". The feature selecting unit 124 then stores the remaining feature candidates resultant of this exclusion, as the features of success of attacks, in the feature DB 114.

To explain using one example, it is assumed herein that the response DB 113 stores therein a response "<html><title>My blog page</title><p>Hello world ! Date: 2017/4/1</p></html>". In this case, the feature selecting unit 124 excludes the feature candidates "title" and "page" that appear in the response, from the feature candidates "title", "page", and "123456789". The feature selecting unit 124 then stores the remaining feature candidate "123456789" resultant of this exclusion in the feature DB 114, as a feature of the success of the attack.

In the manner described above, the feature selecting unit 124 uses the response DB 113 in excluding the universal words from the feature candidate DB 112, but it is also possible for the feature selecting unit 124 to use a list of universal words prepared in advance.

It is also possible for the feature selecting unit 124 to perform any one or both of the exclusions of the feature candidates having extremely short character string lengths and of the feature candidates that are universal words, from the feature candidates extracted by the attack code analyzing unit 123.

The feature inspecting unit 125 refers to the feature DB 114, and determines whether a response from the web server indicates a success of an attack. In other words, the feature inspecting unit 125 determines that an attack has succeeded if the response includes a feature stored in the feature DB 114. If the response does not include any feature stored in the feature DB 114, the feature inspecting unit 125 determines that the attack has failed. The feature inspecting unit 125 then outputs the determination result indicating whether the attack has succeeded or failed.

With the determining apparatus 10 explained above, it is possible to determine whether an attack to a web application has succeeded or failed without requiring any modifications in an existing system, definitions of attacks, or collection of vulnerability information.

[Sequence of Processes]

Figure 4:
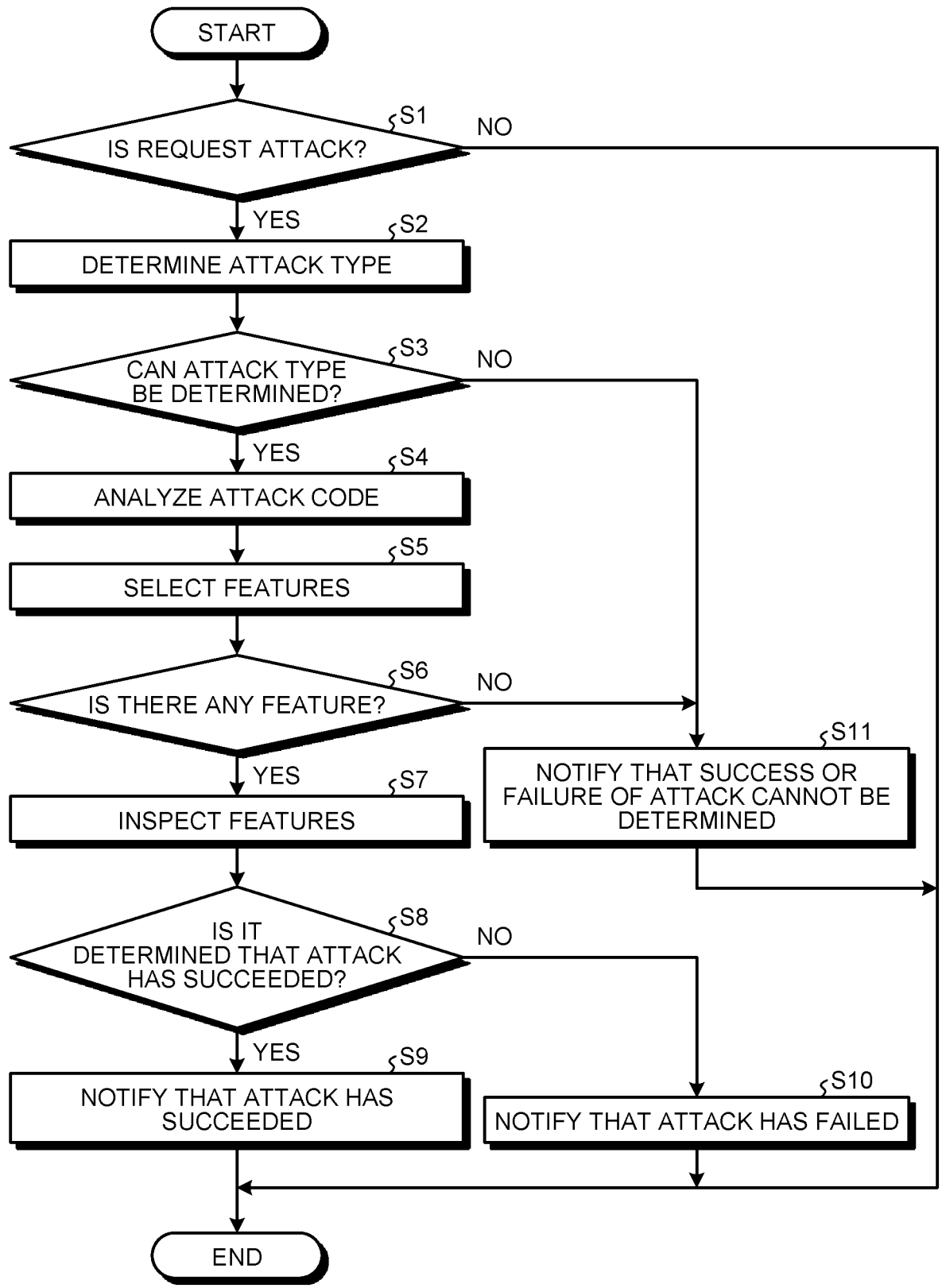
FIG. 4 is a flowchart illustrating the sequence of processes performed by the determining apparatus illustrated in FIG. 2.

The sequence of processes performed by the determining apparatus 10 will now be explained with reference to FIG. 4. To begin with, the attack detecting unit 121 in the determining apparatus 10 determines whether the request to the web application is an attack (S1). If the request is an attack (Yes at S1), the attack type determining unit 122 refers to the attack type keyword list 111, and determines the attack type of the attack code that is included in the request (S2). If the attack type determining unit 122 can determine the attack type (Yes at S3), the attack code analyzing unit 123 executes emulation of the attack code based on the determined attack type, and extracts the information that is output as a result of executing the emulation, as a feature candidate of a success of the attack (S4: attack code analysis). At S1, if the attack detecting unit 121 determines that the request addressed to the web application is not an attack (No at S1), the process is ended.

After S4, the feature selecting unit 124 establishes a selection of the feature candidates, obtained by excluding the feature candidates that are inappropriate as features (e.g., universal words) from the feature candidates extracted at S4, as the features to be used in determining whether an attack has succeeded or failed (S5: selection of features). These features to be used in determining whether an attack has succeeded or failed are stored in the feature DB 114, for example.

After S5, if there is a feature in the feature DB 114 (Yes at S6), the feature inspecting unit 125 determines whether an attack has succeeded by matching a response from the web application, for which the success or failure of an attack is to be determined, against the features stored in the feature DB 114 (S7: feature inspection). In other words, if the response includes a feature stored in the feature DB 114, the feature inspecting unit 125 determines that the attack to the web application has succeeded. If the response does not include any features stored in the feature DB 114, the feature inspecting unit 125 determines that the attack to the web application has failed.

In the feature inspection at S7, if the feature inspecting unit 125 determines that the attack has succeeded (Yes at S8), the feature inspecting unit 125 notifies an external device or the like of the success of the attack (S9). If the feature inspecting unit 125 determines that the attack has failed (No at S8), the feature inspecting unit 125 notifies an external device or the like of the failure of the attack (S10).

If the attack type determining unit 122 fails to determine the attack type at S3 (No at S3), or it is determined that there is no feature in the feature DB 114 at S6 (No at S6), the determining apparatus 10 notifies an external device or the like of the failure of the determination as whether the attack has succeeded or failed (S11).

With the determining apparatus 10 described above, it is possible to determine whether an attack to a web application has succeeded or failed without requiring any modifications in the existing system, definitions of attacks, or collection of vulnerability information.

Second Embodiment

The determining apparatus 10 may also extract a part of the attack code included in a request addressed to the web server (partial attack code), and use the output of an execution of the partial attack code as a feature (or a feature candidate) of a success of the attack. Such a determining apparatus 10 will now be explained as a determining apparatus 10a according to a second embodiment. The elements that are the same as those in the embodiment described above are given the same reference signs, and explanations thereof will be omitted.

Figure 5:
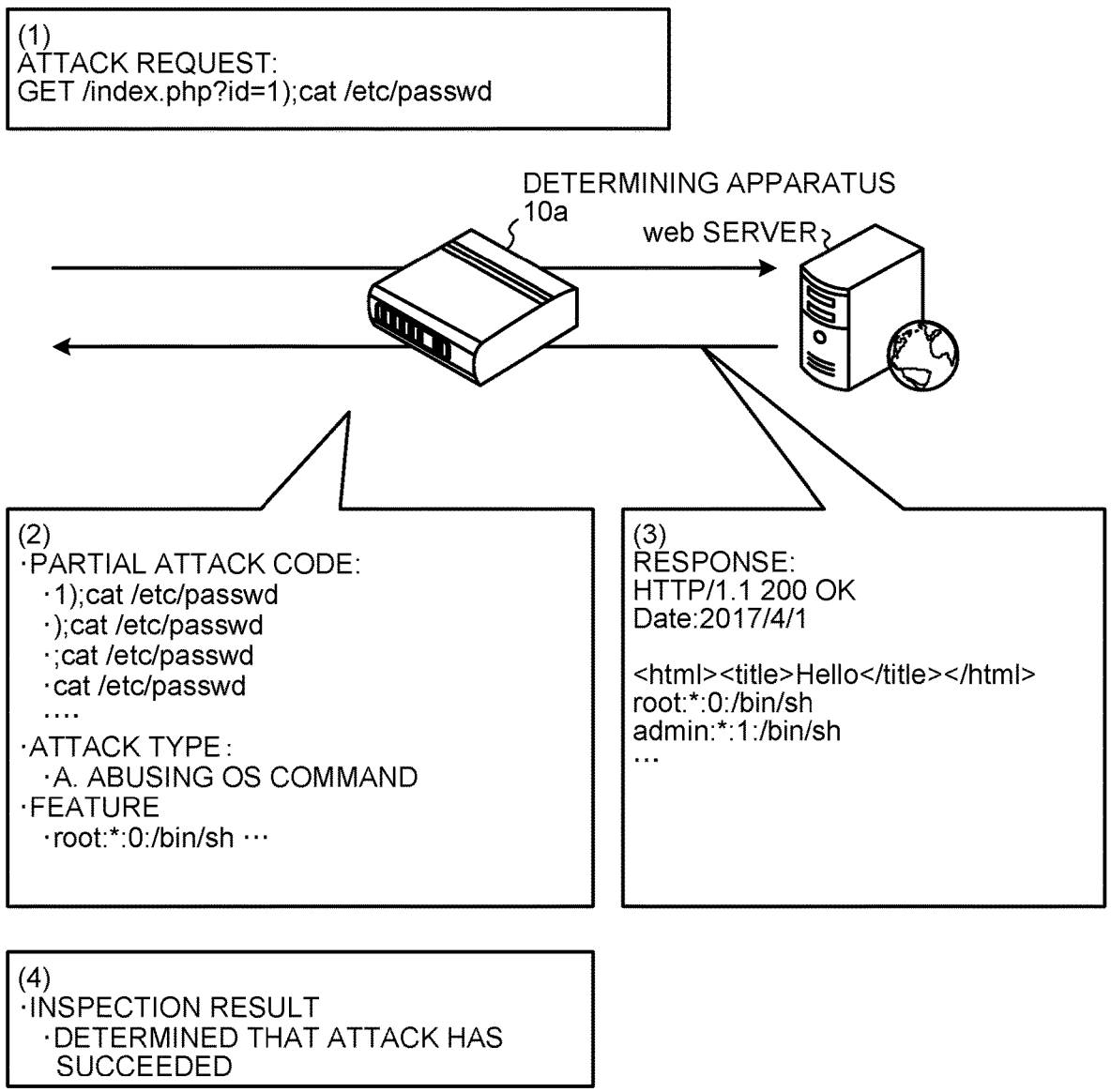
FIG. 5 is a schematic for explaining a general operation of a determining apparatus according to a second embodiment.

A general operation of the determining apparatus 10a will now be explained with reference to FIG. 5. For example, when an attack request "GET/index.php?id=1); cat /etc/passwd" addressed to the web server is received ((1)), the determining apparatus 10a extracts partial attack codes "1); cat/etc/passwd", "); cat/etc/passwd", "; cat /etc/passwd", "cat/etc/passwd", . . . , from the attack code "1); cat /etc/passwd".

Once the attack type of the attack code "1); cat /etc/passwd" is determined as "Attack Type A. abusing an OS command", the determining apparatus 10a performs emulation corresponding to the attack type, for each of the partial attack codes, and extracts a standard output (e.g., "root:*: 0:/bin/sh . . . ") that is output from the web application, as a feature of a success of the attack that uses the partial attack code ((2)). If this feature (e.g., "root:*:0:/bin/sh . . . ") is included in the response from the web server ((3)), the determining apparatus 10a determines that the attack has succeeded ((4)).

In this manner, the determining apparatus 10a can extract a feature of a success of an attack that uses an attack code with which the attack succeeds under a predetermined condition due to the specifications of the web server or the web application, for example.

Examples of a way for extracting parts of an attack code include (1) deleting one character or symbol at a time from the head of the attack code, and (2) deleting the sequence of characters belonging to the same class (e.g., numbers, alphabets, spaces) from the head of the attack code.

The approach for (2) deleting the sequence of characters belonging to the same class (e.g., numbers, alphabets, spaces) from the head of the attack code will now be explained with reference to FIG. 6. It is assumed herein that the character classes have been defined using regular expressions or the like, as illustrated on the right side of FIG. 6, for example.

It is assumed herein that the attack code is "1234);echo 123456789;". In this case, by deleting the sequence of characters belonging to the same class (e.g., numbers, alphabets, spaces) from the head of the attack code, the following partial attack codes are acquired: "1234);echo 123456789;", ");echo 123456789;", ";echo 123456789;", "echo 123456789;", "123456789;", and ";". These parts of the attack code are obtained by the attack code analyzing unit 123 in the determining apparatus 10a, for example.

The attack code analyzing unit 123 then executes emulation of each of these partial attack codes, and acquires outputs illustrated in FIG. 6 from the web application, as the standard outputs/standard error outputs. The attack code analyzing unit 123 then extracts "-bash: syntax error near unexpected token", "123456789", and "-bash: 123456789: command not found" that are the standard outputs, as feature candidates, from these outputs.

The feature selecting unit 124 then selects the feature candidates from the feature candidates extracted by the attack code analyzing unit 123, as the feature candidates to be used as features, and the feature inspecting unit 125 then determines whether an attack has succeeded by using these features on a response that is the target of inspection.

With this determining apparatus 10a, it is possible to determine whether an attack has succeeded for an attack code with which the attack succeeds under a predetermined condition, due to the specifications of the web server or the web application, for example.

Third Embodiment

The determining apparatus 10 may also determine whether the attack has succeeded based on the length of response processing time required for the web server to respond to an attack request. Such a determining apparatus 10 will now be explained as a determining apparatus 10b according to a third embodiment. The elements that are the same as those in the embodiments described above are given the same reference signs, and explanations thereof will be omitted.

Considered herein is an example in which an attack code belonging to the Attack Type A. abusing an OS command, such as "GET/index.php?id=sleep 10;", and an attack code belonging to Attack Type C. abusing an SQL command (functions of a DB), such as "GET/index.php?id=1' union select sleep(10)-", are used in requests to the web server.

When a function for operating an operation time of the web server, e.g., "sleep" mentioned above, is used in an attack code specified in a request, the web server transmits the response after waiting the length of the time specified in "sleep" or the like (e.g., 10 seconds) from when the request is received.

Therefore, when a request addressed to the web application includes an attack code including a function for operating time, such as "sleep" mentioned above (e.g., a function or a command), the determining apparatus 10b measures the time elapsed from when the request addressed to the web application is transmitted to when the response to the request is received (request processing time). The determining apparatus 10b determines that the attack has succeeded if the request processing time is equal to or longer than a predetermined time, and determines that the attack has failed if the request processing time is shorter than the predetermined time.

In this manner, the determining apparatus 10b can determine whether an attack has succeeded, for an attack using an attack code including a function for operating time, such as "sleep" mentioned above (e.g., a function or a command).

An exemplary operation of the determining apparatus 10b will now be explained with reference to FIG. 7. In the determining apparatus 10b, if an attack request to the web server includes an attack code including "sleep" mentioned above ((1)), the attack code analyzing unit 123 performs emulation corresponding to the attack type of the attack code, and stores information in which the attack code (e.g., select sleep( )) is associated with the request processing time taken by the execution of the attack code (e.g., the time set to "select sleep( )"=10 seconds) in the feature DB 114, as a feature of the success of an attack to the web server ((2)).

Upon receiving the response to the attack request transmitted at (1) from the web server ((3)), the feature inspecting unit 125 in the determining apparatus 10b determines whether the request processing time on the web server has the feature of the success of an attack stored at (2). In other words, the feature inspecting unit 125 determines whether the request processing time on the web server is equal to or longer than 10 seconds.

Specifically, the request processing time on the web server is calculated based on the difference between time 2017/4/1 00:00:11 at which the response is transmitted at (3), and time 2017/4/1 00:00:00 at which the request is transmitted at (1). As a result of this calculation, because the request processing time on the web server is 11 seconds (equal to or longer than 10 seconds), the feature inspecting unit 125 determines that the attack has succeeded, as a result of the request inspection ((4)).

With this determining apparatus 10b, it is possible to determine whether an attack has succeeded even for an attack using an attack code including a function for operating time, such as sleep (e.g., a function or a command), for example.

Fourth Embodiment

Figure 8:
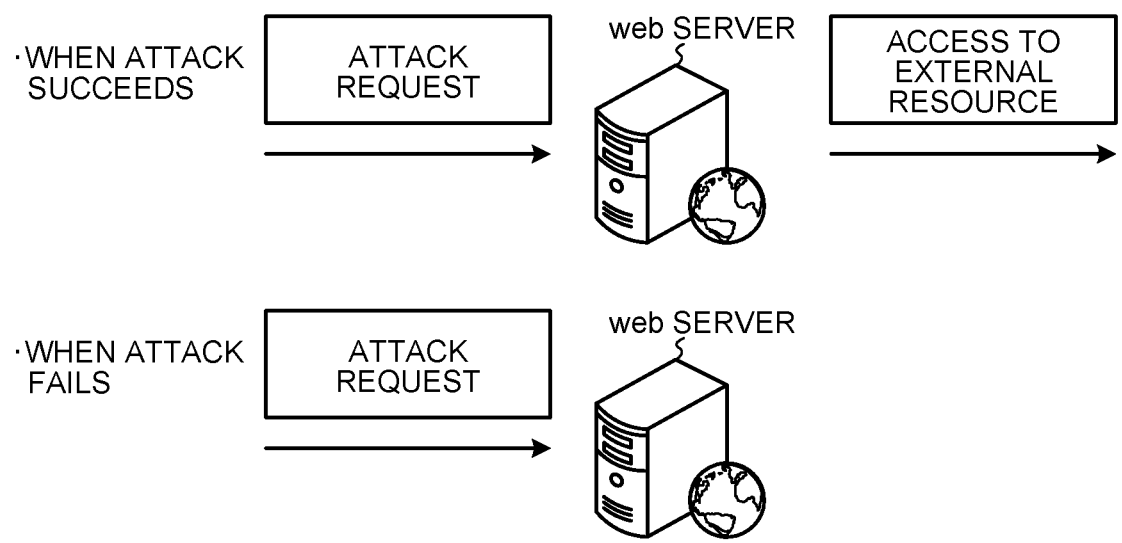
FIG. 8 is a schematic for explaining operations performed by a web server receiving an attack request including an instruction for accessing an external resource, the operations being those when the attack has succeeded and when the attack has failed, respectively.

Some attack codes have main parts thereof located in an external resource. Such an attack code includes an access instruction for directing a target of the attack to the external resource where the main part of the attack code is located. Therefore, for example, as illustrated in FIG. 8, when a web server receives an attack request including an attack code instructing to access an external resource, the web server is caused to access the external resource when the attack succeeds. If the attack fails, the web server is not caused to access the external resource.

Therefore, when the attack code in an attack request addressed to the web server includes an instruction for accessing an external resource, the determining apparatus 10 may determine whether the attack has succeeded based on whether the web server has accessed the external resource. Such a determining apparatus 10 will now be explained as a determining apparatus 10c according to a fourth embodiment. The elements that are the same as those in the embodiments described above are given the same reference signs, and explanations thereof will be omitted.

When it is detected that the execution of the attack code, as a result of emulating the attack code, has resulted in an access to an external resource, the attack code analyzing unit 123 in the determining apparatus 10c extracts the presence of the access to the external resource, as a result of the execution of the attack code, as a feature of the success of the attack to the web server.

The feature inspecting unit 125 then determines whether the attack to the web server to which the attack request is transmitted has succeeded, based on the feature of the success of the attack. For example, when it is detected that the web server has received an attack request including an attack code for instructing to access an external resource, the feature inspecting unit 125 determines whether the web server has accessed the external resource within a predetermined time from when the attack request is received. If it is determined that the web server has accessed the external resource within the predetermined time from when the attack request is received, the feature inspecting unit 125 determines that the attack has succeeded. By contrast, if the web server has not accessed the external resource within the predetermined time from when the attack request is received, the feature inspecting unit 125 determines that the attack has failed.

The presence of an access of the web server to the external resource designated in the attack code is determined based on a result of monitoring accesses from the web server, using the determining apparatus 10c or a network monitoring device (not illustrated) that is installed on a network, for example.

Figure 9:
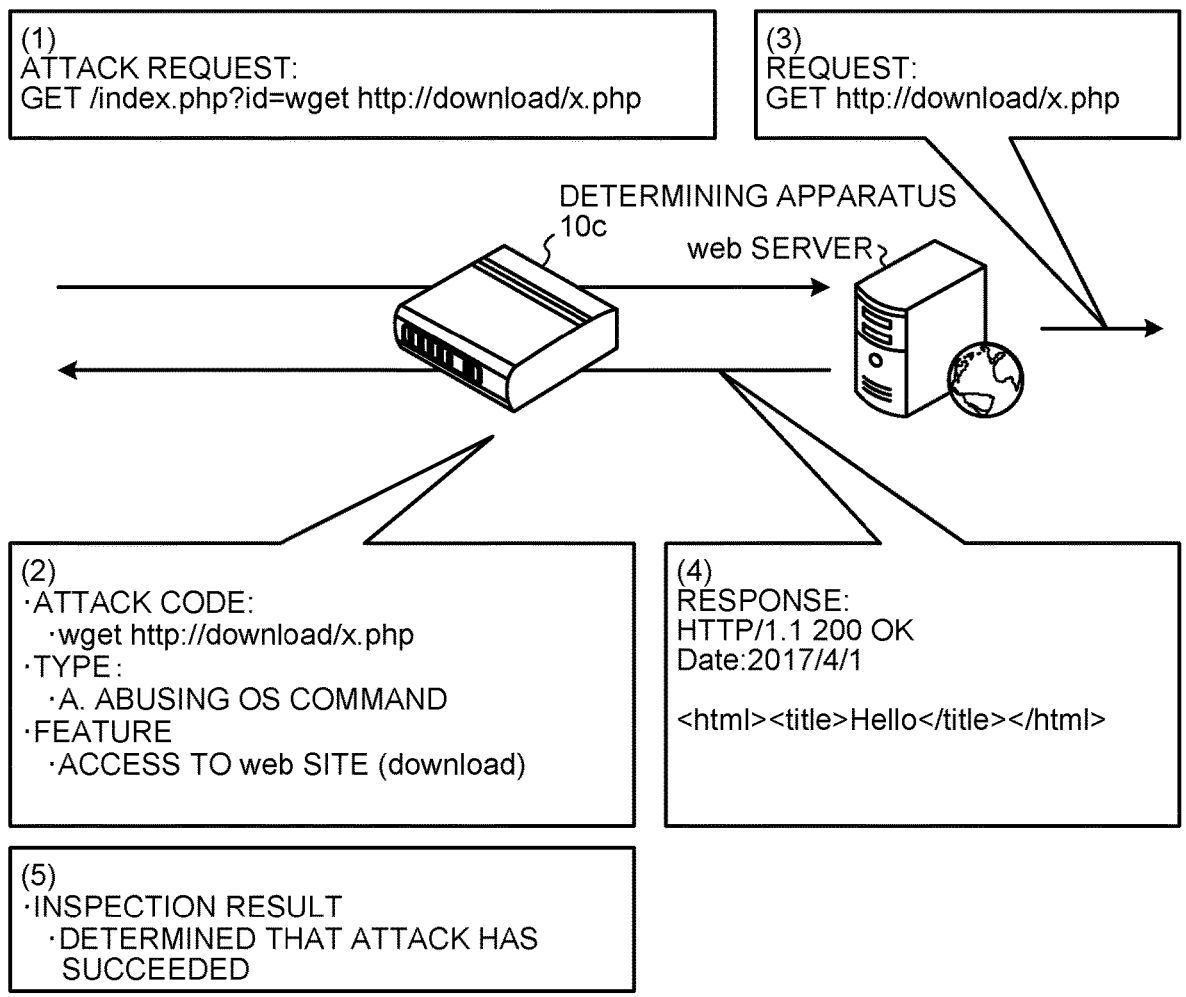
FIG. 9 is a schematic for explaining a general operation of a determining apparatus according to a fourth embodiment.

An exemplary operation of the determining apparatus 10c will now be explained with reference to FIG. 9. It is assumed herein that the attack request addressed to the web server is "GET/index.php?id=wget http://download/x.php" belonging to Attack Type A. abusing an OS command.

Under such an assumption, when the determining apparatus 10c receives the attack request ((1)), the attack code analyzing unit 123 performs emulation corresponding to the attack type of the attack code included in the attack request (Attack Type A. abusing an OS command). The attack code analyzing unit 123 then stores information in which the attack code (e.g., wget http://download/x.php) is associated with the process executed by the execution of the attack code (e.g., access to the website (download) specified in the attack code) in the feature DB 114, as a feature of the success of an attack to the web server ((2)).

The feature inspecting unit 125 in the determining apparatus 10c then determines whether the operation of the web server receiving the attack request described above has the feature stored at (2). For example, the feature inspecting unit 125 checks whether the web server has accessed the external resource designated in the attack request (e.g., http://download/x.php) within a predetermined time from when the attack request is received, by referring to an access log or the like of the web server.

For example, if it is detected that the web server has returned a response ((4)) to the attack request, the feature inspecting unit 125 checks whether the web server has transmitted a request (GET http://download/x.php) ((3)) to the external resource (http://download/x.php) mentioned above within the predetermined time from when the attack request is received. If it has been confirmed that the web server has accessed the external resource (e.g., http://download/x.php) within the predetermined time period from when the web server received the attack request, the feature inspecting unit 125 determines that the attack has succeeded ((5): inspection result: determine that attack has succeeded). By contrast, if the web server has not accessed the external resource (e.g., http://download/x.php) within the predetermined time period from when the web server received the attack request, the feature inspecting unit 125 determines that the attack has failed.

With this determining apparatus 10c, it is possible to determine whether an attack has succeeded even when the main part of the attack code is located in an external resource.

Other Embodiments

The attack detecting unit 121 in the determining apparatus 10a, 10b, or 10c according to the embodiments may be installed outside of the determining apparatus 10. For example, as indicated by reference signs 101, 102 in FIG. 10, the attack detecting unit 121 may be implemented as an attack detection device such as a WAF installed outside of the determining apparatus 10a, 10b, or 10c. Furthermore, the determining apparatus 10a, 10b, or 10c may be configured to be connected directly to the web server for which the successes of attacks are to be determined, as indicated by the reference sign 101 in FIG. 10 (inline mode), or to be connected to the web server via an attack detection device such as a WAF, as indicated by the reference sign 102 in FIG. 10 (tap mode).

[Computer Program]

Furthermore, the functions of the determining apparatus 10 according to the embodiments may be implemented by installing a computer program for implementing the functions, onto a desired information processing apparatus (computer). For example, by causing the information processing apparatus to execute a computer program that is provided as package software or online software, the information processing apparatus may be caused to function as the determining apparatus 10. Examples of the information processing apparatus herein include desktop and laptop personal computers. Mobile communication terminals such as a smartphone, a mobile telephone, and a personal handyphone system (PHS), and also personal digital assistants (PDAs) fall within the scope of the information processing apparatus. The determining apparatus 10 may be implemented on a cloud server.

Figure 11:
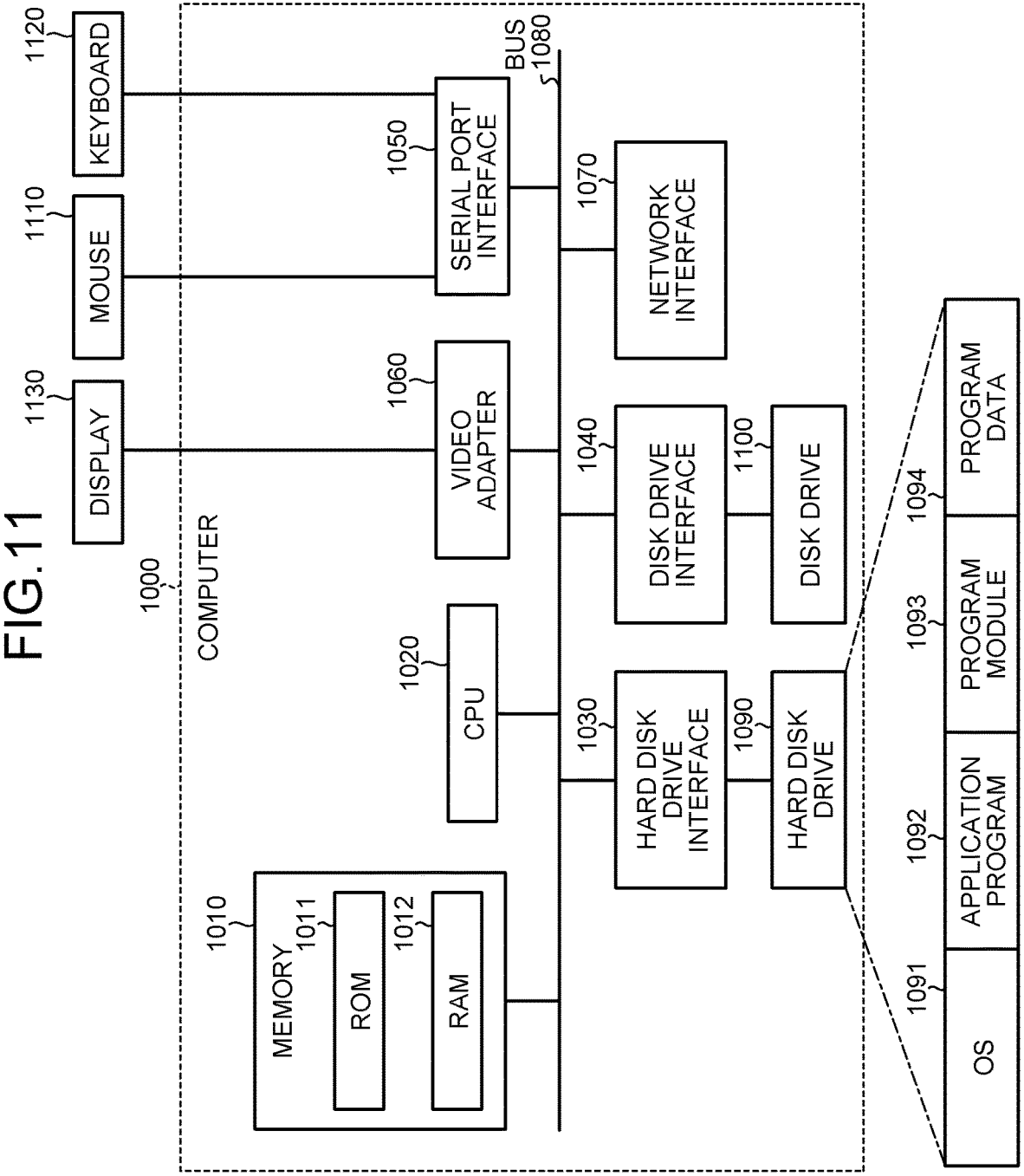
FIG. 11 is a schematic illustrating a computer executing a determining program.

One example of a computer executing the computer program described above (determining program) will now be explained with reference to FIG. 11. As illustrated in FIG. 11, this computer 1000 includes, for example, a memory 1010, a central processing unit (CPU) 1020, a hard disk drive interface 1030, a disk drive interface 1040, a serial port interface 1050, a video adapter 1060, and a network interface 1070. These units are connected to one another via a bus 1080.

The memory 1010 includes a read-only memory (ROM) 1011 and a random access memory (RAM) 1012. The ROM 1011 stores therein a boot program such as Basic Input/Output System (BIOS). The hard disk drive interface 1030 is connected to a hard disk drive 1090. The disk drive interface 1040 is connected to a disk drive 1100. A removable storage medium such as a magnetic disk or an optical disc is inserted into the disk drive 1100. A mouse 1110, a keyboard 1120, and the like are connected to the serial port interface 1050. A display 1130, for example, is connected to the video adapter 1060.

As illustrated in FIG. 11, the hard disk drive 1090 stores therein, for example, an OS 1091, an application program 1092, a program module 1093, and program data 1094. Various types of data and information described above in the embodiments are stored in the hard disk drive 1090 or the memory 1010, for example.

The CPU 1020 then reads the program module 1093 or the program data 1094 stored in the hard disk drive 1090 onto the RAM 1012 as required, and executes each of the steps described above.

The location where the program module 1093 and the program data 1094 related to the determining program are stored is not limited to the hard disk drive 1090, and may be stored in a removable storage medium, and read by the CPU 1020 via the disk drive 1100, for example. Alternatively, the program module 1093 and the program data 1094 related to the computer program may be stored in another computer connected over a network such as a local area network (LAN) or a wide area network (WAN), and may be read by the CPU 1020 via the network interface 1070.

REFERENCE SIGNS LIST

10 determining apparatus
11 storage unit
111 attack type keyword list
112 feature candidate DB
113 response DB
114 feature DB
121 attack detecting unit
122 attack type determining unit
123 attack code analyzing unit
124 feature selecting unit
125 feature inspecting unit

The invention claimed is:

1. A determining apparatus for determining whether an attack to a server using an attack code has succeeded or failed, the determining apparatus comprising:
   a memory; and
   a processor coupled to the memory and programmed to execute a process comprising:
   determining an attack type of an attack code included in an attack request that is addressed to the server;
   executing emulation of an attack with the attack code to the server based on the determined attack type, and extracting a feature that appears in a response issued by the server when the emulation results in a successful attack to the server; and
   determining that the attack with the attack code has succeeded when a response from the server for which a success or failure of the attack is to be determined has the extracted feature.

2. The determining apparatus according to claim 1, wherein the processor executes a process further comprising:
   excluding a feature having a character string length equal to or shorter than a predetermined threshold, or a feature appearing at a frequency equal to or higher than a predetermined threshold in responses to non-attack requests, from features extracted by the extracting to generate resultant features, and
   wherein the determining determines that the attack with the attack code has succeeded when a response from the server for which a success or failure of the attack is to be determined has the resultant features.

3. The determining apparatus according to claim 1, wherein the determining determines an attack type, using a keyword included in the attack code, the attack type of the attack code to be one of an attack type using an operating system (OS) command, an attack type using a program code, an attack type using an SQL command, an attack type using a HyperText Transfer Protocol (HTTP) response, and an attack type using a file operation.

4. The determining apparatus according to claim 1, wherein the executing executes emulation of an attack using a part of the attack code, and the extracting extracts a feature that appears in a response issued by the server when the emulation executing the part of the attack code results in a successful attack to the server.

5. The determining apparatus according to claim 1, wherein, when an attack code included in the attack request includes a code for operating an operation time of the server, the extracting sets a value corresponding to request processing time taken from when the server receives the request to when the server transmits the response to the request, as a feature appearing in a response issued by the server when the attack succeeds.

6. The determining apparatus according to claim 1, wherein when an attack code included in the attack request includes a code for instructing the server to access an external resource, the extracting sets an access from the server to the external resource within a predetermined time from when the attack request is received, as a feature appearing in a response issued by the server when the attack succeeds.

7. A determination method for determining whether an attack to a server using an attack code has succeeded or failed, the determination method by which a determining apparatus executes:

determining an attack type of an attack code included in an attack request that is addressed to the server;

executing emulation of an attack with the attack code to the server based on the determined attack type, and extracting a feature that appears in a response issued by the server when the emulation results in a successful attack to the server; and determining that the attack with the attack code has succeeded when a response from the server for which a success or failure of the attack is to be determined has the extracted feature.

8. A non-transitory computer readable storage medium having stored therein a determining program for determining whether an attack to a server using an attack code has succeeded or failed, the determining program causing a computer to execute a process comprising:

determining an attack type of an attack code included in an attack request that is addressed to the server;

executing emulation of an attack with the attack code to the server based on the determined attack type, and extracting a feature that appears in a response issued by the server when the emulation results in a successful attack to the server; and determining that the attack with the attack code has succeeded when a response from the server for which a success or failure of the attack is to be determined has the extracted feature.

\* \* \* \* \*